(12) United States Patent
Diaz

(10) Patent No.: US 7,433,602 B2
(45) Date of Patent: Oct. 7, 2008

(54) IMPLEMENTATION OF GRADUAL IMPEDANCE GRADIENT TRANSMISSION LINE FOR OPTIMIZED MATCHING IN FIBER OPTIC TRANSMITTER LASER DRIVERS

(75) Inventor: Nelson Diaz, Westminster, CO (US)

(73) Assignee: Finisar Corporation, Sunnyvale, CA (US)

( * ) Notice: Subject to any disclaimer, the term of this patent is extended or adjusted under 35 U.S.C. 154(b) by 459 days.

(21) Appl. No.: 10/756,560

(22) Filed: Jan. 13, 2004

(65) Prior Publication Data

US 2005/0152704 A1    Jul. 14, 2005

(51) Int. Cl.
*H04B 10/12* (2006.01)
*H04B 10/04* (2006.01)

(52) U.S. Cl. .................. 398/141; 398/192; 398/200

(58) Field of Classification Search ......... 398/140–142, 398/158, 159, 192, 194, 200; 372/26, 38.02; 333/34, 246
See application file for complete search history.

(56) References Cited

U.S. PATENT DOCUMENTS

| | | | |
|---|---|---|---|
| 4,283,694 A * | 8/1981 | Pauker | 333/34 |
| 5,119,048 A * | 6/1992 | Grunwell | 333/34 |
| 6,152,607 A | 11/2000 | Weigel | |
| 6,178,283 B1 | 1/2001 | Weigel | |
| 6,379,053 B1 | 4/2002 | van Doorn | |
| 6,396,363 B1 | 5/2002 | Alexanian et al. | |
| 6,409,397 B1 | 6/2002 | Weigert | |
| 6,421,495 B1 | 7/2002 | Hoffmeister et al. | |
| 6,424,785 B1 | 7/2002 | Melchior | |
| 6,430,326 B1 | 8/2002 | Plickert et al. | |
| 6,482,017 B1 | 11/2002 | Van Doorn | |
| 6,493,121 B1 | 12/2002 | Althaus | |
| 6,494,623 B1 | 12/2002 | Ahrens et al. | |
| 6,532,280 B1 | 3/2003 | McDonald | |
| 6,533,470 B2 | 3/2003 | Ahrens | |
| 6,540,413 B1 | 4/2003 | Althaus et al. | |
| 6,556,099 B2 | 4/2003 | Khan et al. | |
| 6,559,995 B2 | 5/2003 | Tokita | |
| 6,580,865 B1 | 6/2003 | Doorn | |
| 6,597,321 B2 | 7/2003 | Thursby et al. | |
| 6,607,309 B2 | 8/2003 | Kuhn et al. | |
| 6,628,860 B1 | 9/2003 | Van Doorn | |
| 2004/0202214 A1 * | 10/2004 | Aronson et al. | 372/38.02 |
| 2004/0208207 A1 * | 10/2004 | Kasper et al. | 372/26 |
| 2006/0226930 A1 * | 10/2006 | Carvalho et al. | 333/34 |

FOREIGN PATENT DOCUMENTS

JP    2003124712    4/2003

* cited by examiner

*Primary Examiner*—Dalzid Singh
(74) *Attorney, Agent, or Firm*—Workman Nydegger

(57) ABSTRACT

A transmitter in a fiber optic system is provided, including a driver circuit, a light emitting source, and transmission lines. The driver circuit is configured to receive a modulated electrical signal and to have a driver circuit output impedance. The light emitting source has a light emitter impedance that is different than the driver circuit output impedance. The light emitting source is configured to receive the modulated electrical signal such that it produces a modulated optical signal proportional to modulated electrical signal. The transmission lines are coupled between the driver circuit and the light emitting source for transmitting the modulated electrical signal from the driver circuit to the light emitting source. The transmission lines gradually change the impedance between the driver circuit and the light emitting source so as to gradually match the driver circuit output impedance to the light emitter impedance.

30 Claims, 3 Drawing Sheets

IMPLEMENTATION OF GRADUAL IMPEDANCE GRADIENT TRANSMISSION LINE FOR OPTIMIZED MATCHING IN FIBER OPTIC TRANSMITTER LASER DRIVERS

BACKGROUND

This invention relates to a transmitter in a fiber optic system. The transmitter utilizes a transmission line that is configured to achieve optimized impedance matching without use of an impedance matching network.

Fiber optic systems generally have three main components, a transmitter, a transmission medium, and a receiver. Fiber optic systems use light pulses to transmit information down fiber lines, which are then received and generally translated to electrical signals. Optical receivers generally receive and convert a modulated light signal coming from the optical fiber back into a replica of the original signal, which was applied to the transmitter.

A transmitter generally includes driver circuit and an optical emitter that are electrically coupled. The optical emitter can be a laser or LED. The driver circuit receives a modulated electrical signal that contains information that is to be transmitted over the optical fiber in the form of a modulated optical signal. The driver circuit is coupled to the laser or LED and is configured to cause the light-emitting device to generate a modulated optical signal based upon the modulated electrical signal.

Modern day fiber optic systems are required to be operated at increasingly high frequency rates. The frequency of the electrical signal sent from the driver circuit to the light emitter is often so high that the signal acts like a wave. Accordingly, one important consideration for driver circuits in driving light emitters in the transmitters of the fiber optic system is impedance matching of the elements. If the output of the driver circuit has different impedance than does the light emitter, signal reflections will occur. Signal reflections disturb the standing-wave oscillation and cause intersymbol interference in the light emitter that can cause significant intolerable error in the fiber optic transmission system.

In order to compensate for mismatched impedance, most transmitters also include an impedance matching network that can interface the output of the driver circuit with the light emitter such that the impedance will appear matched from both the light emitter and from the driver circuit. Typically a light emitter load like a laser will have lower impedance than the output of the driver circuit. Consequently, a typical matching network will include a plurality of resistive elements that will deflect some of the signal from the light emitter so that the impedance matching and there will be no reflections.

Unfortunately, these matching networks cause significant wasted energy in the system and are often difficult to place where required due to geometric restrictions. Because part of the signal goes through these matching networks so that impedance will be well matched, portions of the signal are typically going though resistors in the matching network that are parallel with the load. Some of this diverted current will release energy as heat, which is wasted energy in the system. Energy from the diverted current in the matching network that is not released as heat can instead generate electromagnetic interference, which can cause additional problems for other parts of the system.

SUMMARY

The present invention is a transmitter for use in a fiber optic system. The transmitter includes a driver circuit, a light emitting source, and transmission lines. The driver circuit is configured to receive a modulated electrical signal and to have a driver circuit output impedance. The light emitting source has a light emitter impedance that is different than the driver circuit output impedance. The light emitting source is configured to receive the modulated electrical signal such it produces a modulated optical signal proportional to modulated electrical signal. The transmission lines are coupled between the driver circuit and the light emitting source for transmitting the modulated electrical signal from the driver circuit to the light emitting source. The transmission lines gradually change the impedance between the driver circuit and the light emitting source so as to gradually match the driver circuit output impedance to the light emitter impedance.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
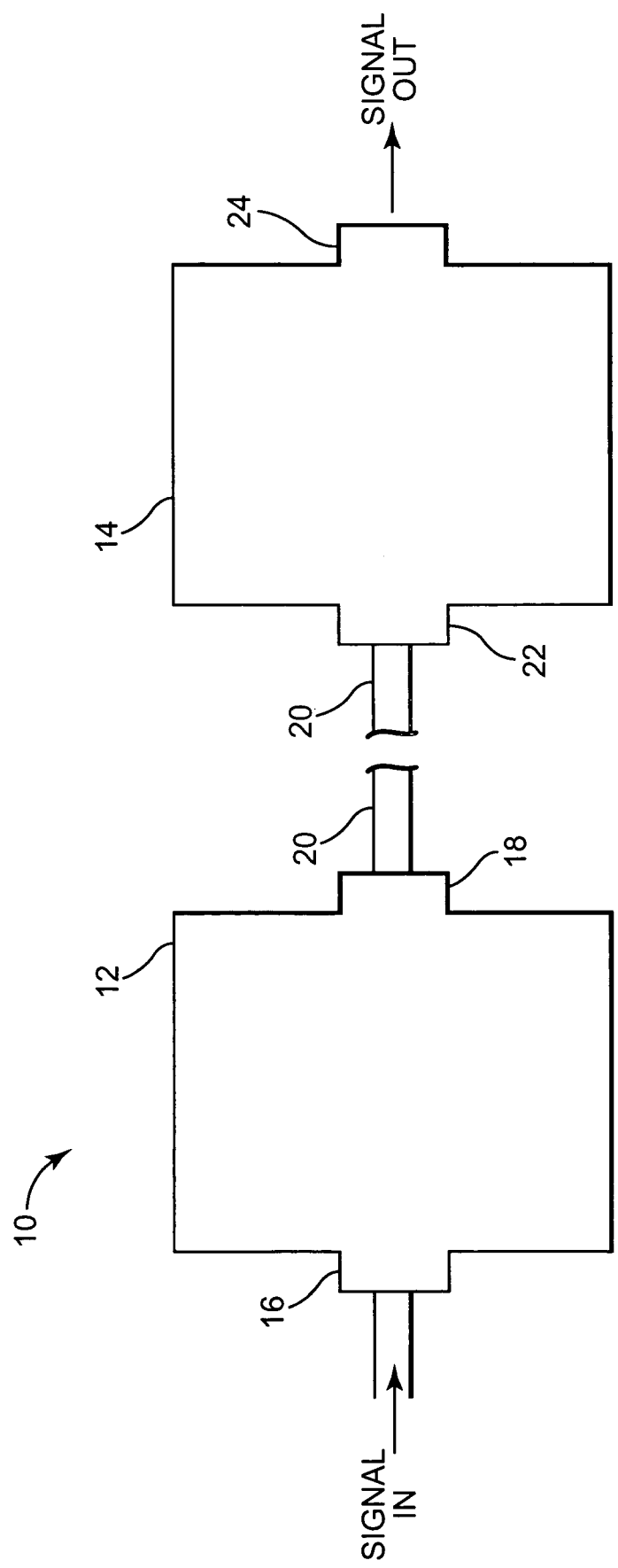
FIG. 1 illustrates a fiber optic system.

FIG. 1 illustrates fiber optic system 10. A fiber optic system 10 includes transmitter 12, receiver 14, electrical input connector 16, optical connectors 18 and 22, optical fiber 20, and output signal connector 24. In operation, transmitter 12 is coupled to an information source by input connector 16. The information source transfers information via a modulated electrical signal, which is coupled to electrical connector 16 and then to transmitter 12. Transmitter 12 contains a light source, typically a LED or a laser. The light source is driven by the electrical signal received by transmitter 12. This generates a modulated optical signal which is then transmitted to optical fiber 20.

Optical fiber 20 generally includes a cylindrical core, a concentric cylindrical cladding surrounding the core, and a concentric cylindrical protective jacket or buffer surrounding the cladding. The core is made of transparent glass or plastic having a certain index of refraction. The cladding is also made of transparent glass or plastic, but having a different, smaller, index of a fraction. Optical fiber 20 acts as a bendable waveguide and its characteristics are largely determined by the relative refractive indices of the core and the cladding. The optical fiber 20 can be routed over distances such that transmitter 12 and receiver 14 may be located in distant locations relative to each other.

Optical fiber 20 is coupled to receiver 14 via optical connector 22. Receiver 14 includes an optical detector and related electronic circuitry. Typically, the optical detector is a photodiode of either a PIN or avalanche type. The optical detector typically has a relatively large sensitive detecting area that can be several hundred microns in diameter. Consequently, optical signals from optical fiber 20 can be easily detected by the optical detector. When optical signals reach the optical detector, it converts the optical energy, in the form of photons, into electrical energy. The output of the optical detector is a flow of electrical current that is proportional to the received optical power signals. This electrical current is then received by the receiver electronic circuitry for further processing. The output signal is a replica of the original signal, which was applied to the transmitter 12.

Figure 2:
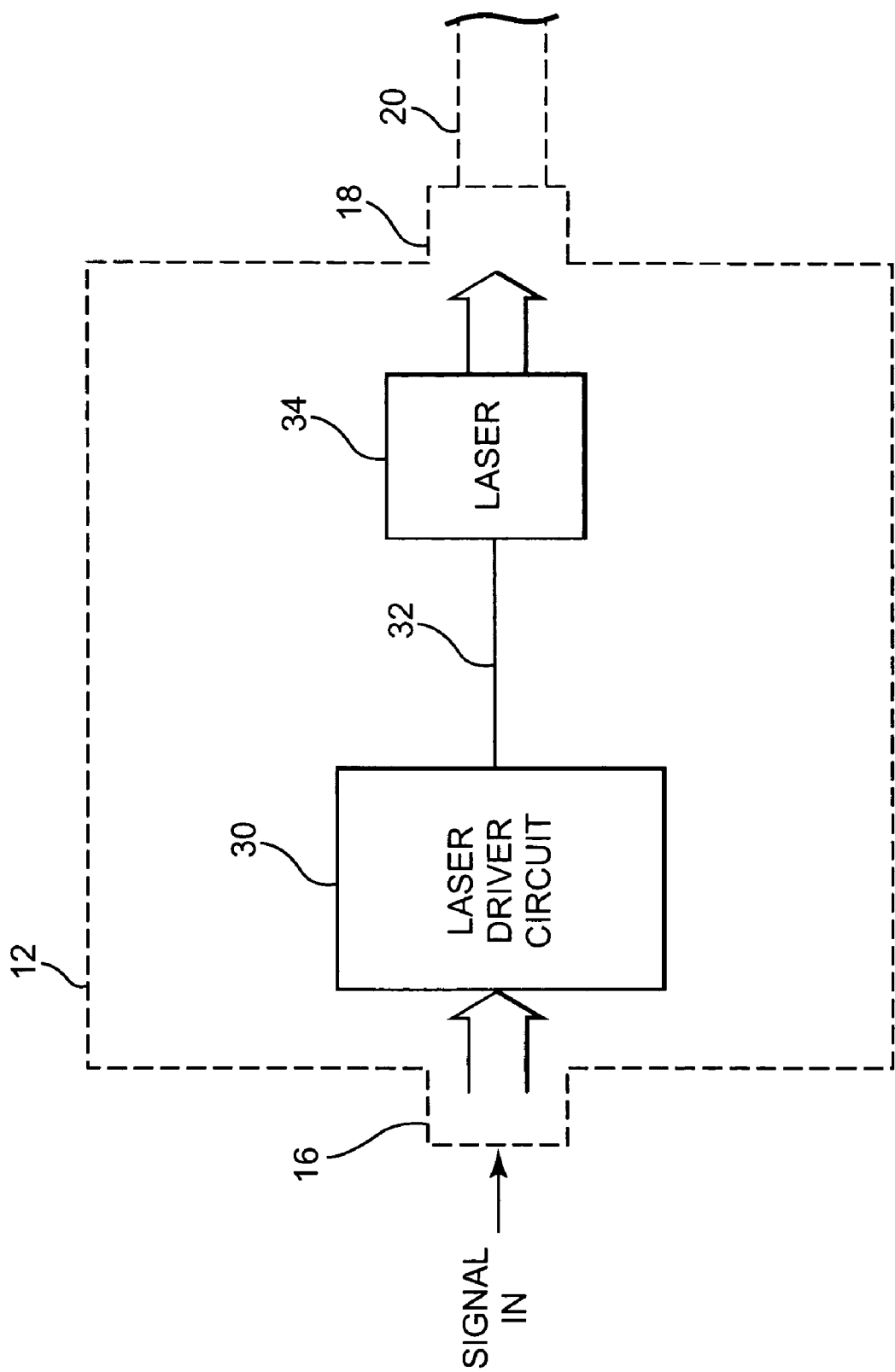
FIG. 2 illustrates a transmitter in a fiber optic system.

FIG. 2 illustrates an exemplary implementation transmitter 12 in accordance with the present invention. Transmitter 12 includes laser driver circuit 30, transmission line 32, and laser 34. An original modulated electrical signal that contains information to be transmitted over the fiber optic system 10 is received by transmitter 30 via coupler 16 and sent to laser driver circuit 30 for processing. Laser driver circuit 30 is coupled to laser 34 by transmission line 32 and generates an electrical driver signal from the modulated electrical signal. The electrical driver signal is transmitted over transmission line 32 to laser 34 thereby causing laser 34 to produce an optical output directly proportional to the electrical driver signal and the original modulated electrical signal. This optical output is transmitted to the optical fiber 20 via coupler 18. One skilled in the art will recognize that laser 34 could also be a different light-emitting source, such as a light emitting diode, consistent with the present invention.

Laser driver circuit 30 is configured to receive the original modulated electrical signal at a very high frequency. Such frequencies can be on the order of several gigahertz or more. Similarly, the driver electrical signal sent from the driver circuit 30 to the laser 34 is of such high frequency that the signal acts like a wave. Accordingly, it is important that the output impedance of driver circuit 30 be matched to the input impedance of laser 34 in order to avoid signal reflections and noise in laser 34. When the transmission line 32 is much longer than the wavelength of the signal, signal reflections will disturb the standing-wave oscillation and cause noise in the light emitter that can cause significant intolerable error in the fiber optic transmission system 10. The transmission line 32 in fiber optic system 10 may be on the order of 1 inch or more, such that signals on the order of gigahertz will cause very significant reflections in unmatched systems.

Typically, however, the output impedance of driver circuit 30 is not matched to the input impedance of laser 34. In fact, in some embodiments of the present invention, the output impedance of driver circuit 30 is between 50 Ohms and 75 Ohms, and the input impedance of laser 34 is between 5 Ohms and 25 Ohms. In some cases, the output impedance of driver circuit 30 is greater than or equal to 100 Ohms. Consequently, in order to avoid signal reflections between driver circuit 30 and laser 34 the impedance must be matched. Rather than using an impedance matching network with lumped circuit components, however, transmission line 32 is used to gradually match impedance, and thereby avoid signal reflections between driver circuit 30 and laser 34.

Using transmission line 32 to both transmit the driver electrical signal and to gradually match the impedance between driver circuit 30 and laser 34 avoids the significant wasted energy that occurs with impedance matching network. It also avoids energy being release from the system as heat or as electromagnetic interference.

Furthermore, the impedance of transmission line 32 changes slowly over time. Because impedance transitions slowly, the reflections are not large steps and reflections are minimized. Since the system is essentially matched as the signal moves from driver circuit 30 to laser 34, it eliminates the issue of reflection and it also allows most of the actual power to go though to the laser 34.

FIGS. 3A-3D illustrate a variety of ways in which transmission line 32 can be tapered in order to achieve the gradual change in impedance of the line in accordance with the present invention. For example, in FIG. 3A, transmission line 32 is illustrated by first and second lines 40 and 42. Lines 40 and 42 connect between driver circuit 30 and laser 34. Where lines 40 and 42 connect to driver circuit 30 they are separated from each other by a distance $X_{40-42}$. Where lines 40 and 42 connect to laser 34 they are separated from each other by a distance $Y_{40-42}$. Distance $X_{40-42}$ is larger than distance $Y_{40-42}$ such that lines 40 and 42 are farther from each other immediately adjacent driver circuit 30 then they are immediately adjacent laser 34. In this way, the impedance of transmission line 32 changes slowly so that it starts off matching the higher output impedance of driver circuit 30 and ends up matching the lower impedance of the input of laser 34. This slow gradual change provides excellent matching characteristics, and avoids losses associated with prior systems.

In one embodiment, lines 40 and 42 are rectangular in cross-section and are made of a metallic material. As metal lines 40 and 42 get closed together, moving from $X_{40-42}$ to $Y_{40-42}$, the capacitance between the two increase and the impedance decreases. This provides the gradual impedance matching characteristics of lines 40 and 42.

In one embodiment, the distance between lines 40 and 42 changes from $X_{40-42}$ to $Y_{40-42}$ linearly, such that there is a constant change in the distance between lines 40 and 42 over their length from driver circuit 30 to laser 34. In another embodiment, the change is exponential, such that there is an increasing change in the distance between lines 40 and 42 over their length from driver circuit 30 to laser 34. Various different configurations for varying distances between lines 40 and 42 are possible to achieve a gradual change in impedance over the length of transmission lines 32 such that output impedance of driver circuit 30 is matched at one side and input impedance of laser 34 is matched at the other side.

Figure 3A:
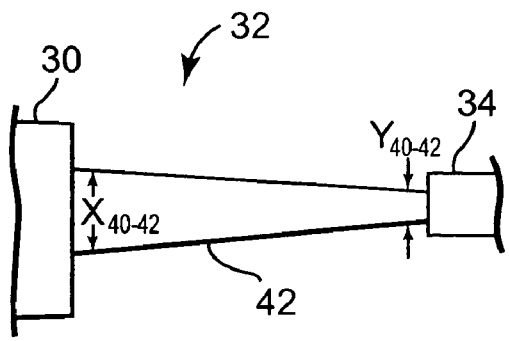
FIGS. 3A-3D illustrate tapered transmission lines in a transmitter in accordance with the present invention.
Figure 3B:
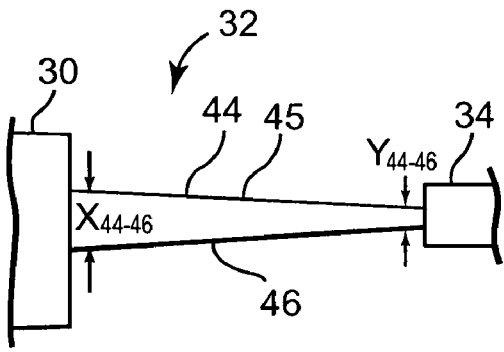

In FIG. 3B, transmission line 32 is illustrated by first and second lines 44 and 45. Lines 44 and 45 are connected between driver circuit 30 and laser 34 and are parallel to each other in a single transmission plane. They are illustrated in FIG. 3B as a single line. Lines 44 and 45 and the transmission plane are separate from a ground plan 46. Where lines 44 and 45 connect to driver circuit 30 they are separated from ground plane 46 by a distance $X_{44-46}$. Where lines 44 and 45 connect to laser 34 they are separated from ground plane 46 by a distance $Y_{44-46}$. Distance $X_{44-46}$ is larger than distance $Y_{44-46}$ such that lines 44 and 45 are farther from the ground plane 46 immediately adjacent driver circuit 30 then they are immediately adjacent laser 34. In this way, the impedance of transmission line 32 changes slowly so that it starts off matching the higher output impedance of driver circuit 30 and ends up matching the lower impedance of the input of laser 34. This slow and gradual change provides excellent matching characteristics, and avoids losses associated with prior systems.

Figure 3C:
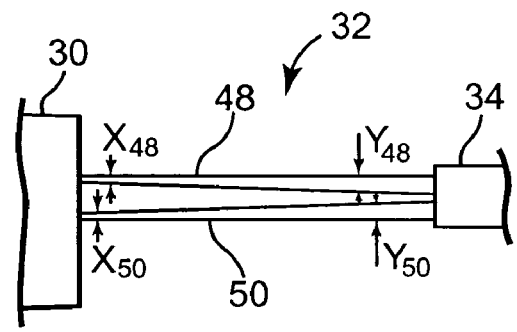

In FIG. 3C, transmission line 32 is illustrated by first and second lines 48 and 50. Lines 48 and 50 are connected between driver circuit 30 and laser 34. Where lines 48 and 50 connect to driver circuit 30 they each have smaller diameters $X_{48}$ and $X_{50}$. Where lines 48 and 50 connect to laser 34 they each have larger diameters $Y_{48}$ and $Y_{50}$. Diameter $X_{48}$ immediately adjacent driver circuit 30 is smaller than diameter $Y_{48}$ immediately adjacent laser 34 such that the diameter of line 48 gradually tapers down from driver circuit 30 to laser 34. Similarly, diameter $X_{50}$ immediately adjacent driver circuit 30 is smaller than diameter $Y_{50}$ immediately adjacent laser 34 such that the diameter of line 50 gradually tapers down from driver circuit 30 to laser 34. In this way, the impedance of transmission line 32 changes slowly so that it starts off matching the higher output impedance of driver circuit 30 and ends up matching the lower impedance of the input of laser 34. This slow gradual change provides excellent matching characteristics, and avoids losses associated with prior systems.

Figure 3D:
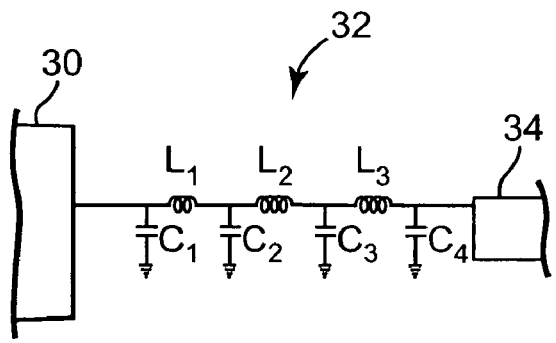

FIG. 3D illustrates the characteristics of transmission lines 32. Essentially, the tapering of transmission line 32 is the circuit equivalent of a R-C network providing a gradual change in impedance along the length of transmission line 32. In FIG. 3D this is shown as inductors $L_1$ through $L_3$ and capacitors $C_1$ through $C_4$ connected in a network to provide a gradual impedance change over a distance between driver circuit 30 and laser 34. For example, in a fiber optic system 10 where the output impedance of driver circuit 30 is 50 Ohms and the input impedance of laser 34 is 5 Ohms, the impedance of the transmission line 32 changes slowly so that it starts off at 50 Ohms and over the length of transmission line 32 it becomes 5 Ohms. This gradual transition, due to the tapered transmission line 32, eliminates the issue of reflection and it also allows most of the actual power to go though to the laser 32.

The actual tapering of transmission line 32 to effectuate the gradual impedance matching can be implemented in transmitter 12 in a variety of ways, as illustrated by FIGS. 3A-C and the accompanying explanations. These various tapering techniques could also be combined in various ways to achiever gradual impedance matching. Other configurations are also available, independently or in combination with these configurations, to achieve the gradual matching of the present invention. For example, the material composition of transmission line 32 can be varied throughout its length so that the change in material can provide the gradual impedance change over the length of transmission line 32, thereby eliminating the issue of reflection and also allowing most of the actual power to go though to the laser 32.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, although several embodiments of the present invention have been described such that the impedance of the transmission line gradually decreases over its length, it can be seen that the transmission line can be configured such that the impedance gradually increases over its length in situations where the driver circuit has a lower output impedance than the input impedance of the laser. This application is intended to cover any adaptations or variations of the specific embodiments discussed herein. Therefore, it is intended that this invention be limited only by the claims and the equivalents thereof.

What is claimed is:

1. A transmitter in a fiber optic system, the transmitter comprising:
    a driver circuit configured to receive a modulated electrical signal and to have a driver circuit output impedance;
    a light emitting source having a light emitter impedance different than the driver circuit output impedance, the light emitting source configured to receive the modulated electrical signal such that it produces a modulated optical signal proportional to the modulated electrical signal; and
    a transmission line comprising two lines, the transmission line having a length between a first end and a second end, the two lines coupled to the driver circuit at the first end and to the light emitting source at the second end such that the two lines transmit the modulated electrical signal from the driver circuit to the light emitting source, the two lines configured such that impedance of the transmission line gradually changes over the length so that the two lines match the impedance of the driver circuit at the first end and match the impedance of the light emitter at the second end.

2. The transmitter of claim 1 wherein the two lines gradually change the capacitance and impedance along the length such that the two lines gradually match the driver circuit output impedance at the first end to the light emitter impedance at the second end without use of lumped circuit components.

3. The transmitter of claim 1 wherein the two lines are spaced apart from each other in a transmission plane, the transmission plane being located adjacent a ground plane.

4. The transmitter of claim 3 wherein the two lines are spaced apart from each other at the first end by a first distance and spaced apart from each other at the second end by a second distance, the first distance being greater than the second distance.

5. The transmitter of claim 3 wherein the two lines are spaced apart from each other at the first end by a first distance and spaced apart from each other at the second end by a second distance, the first distance being less than the second distance.

6. The transmitter of claim 3 wherein the lines in the transmission plane are spaced apart from the ground plane at the first end by a first distance and wherein the lines in the transmission plane are spaced apart from the ground plane at the second end by a second distance, the first distance being greater than the second distance.

7. The transmitter of claim 3 wherein the lines in the transmission plane are spaced apart from the ground plane at the first end by a first distance and wherein the lines in the transmission plane are spaced apart from the ground plane at the second end by a second distance, the first distance being less than the second distance.

8. The transmitter of claim 3 wherein each of the lines has a varying diameter over the length of the transmission line such that the diameters of the two lines at the first end are smaller than the diameters of the two lines at the second end.

9. The transmitter of claim 3 wherein each of the lines has a varying diameter over the length of the transmission line such that the diameters of the two lines at the first end are larger than the diameters of the two lines at the second end.

10. The transmitter of claim 3 wherein a distance between the two lines changes exponentially from the first end to the second end.

11. The transmitter of claim 1 wherein the driver circuit output impedance is higher than the light emitter impedance.

12. The transmitter of claim 1 wherein the driver circuit output impedance is between 50 Ohms and 75 Ohms and the light emitter impedance is between 5 Ohms and 25 Ohms such that the transmission line impedance gradually changes over its length from between 50 Ohms and 75 Ohms to between 5 Ohms and 25 Ohms.

13. The transmitter of claim 1 wherein the driver circuit is a laser driver circuit and the light emitter source is a laser diode.

14. The transmitter of claim 1 wherein the driver circuit is a light emitting diode driver circuit and the light emitter source is a light emitting diode.

15. The transmitter of claim 1 wherein the driver circuit output impedance is 50 Ohms and the light emitter impedance is 5 Ohms and the two lines taper to gradually decrease impedance so as to match the driver circuit and the light emitter source.

16. A fiber optic communication system comprising:
a signal transmitter that produces an optical signal of varying light intensity, the transmitter further comprising:
a driver circuit configured to receive an original modulated electrical signal and to generate a driver electrical signal, the driver circuit configured to have a driver circuit output impedance;
a light emitting source having a light emitter impedance different than the driver circuit output impedance, the light emitting source configured to receive the original modulated electrical signal such that it produces the optical signal of varying light intensity that is proportional to the original modulated electrical signal; and
a transmission line comprising two lines coupled between the driver circuit and the light emitting source such that the two lines transmit the driver electrical signal from the driver circuit to the light emitting source, the two lines configured such that impedance of the transmission line gradually changes such that the two lines match both the driver circuit output impedance and the light emitter impedance;
an optical fiber coupled to the signal transmitter that receives and transmits the optical signal; and
a receiver coupled to the optical fiber that receives the optical signal and converts the received optical signal into an output electrical signal that is a replica of the original modulated electrical signal.

17. The fiber optic communication system of claim 16 wherein the two lines gradually change the impedance along a length of the transmission line such that the two lines gradually match the driver circuit output impedance to the light emitter impedance without use of lumped circuit components.

18. The fiber optic communication system of claim 16 wherein the two lines are spaced apart from each other immediately adjacent the driver circuit by a first distance and spaced apart from each other immediately adjacent the light emitter by a second distance, the first distance being greater than the second distance.

19. The fiber optic communication system of claim 16 wherein the two lines are spaced apart in a transmission plane, the transmission plane being located adjacent a ground plane and wherein the two lines in the transmission plane are spaced apart from the ground plane immediately adjacent the driver circuit by a first distance and wherein the two lines in the transmission plane are spaced apart from the ground plane immediately adjacent the driver circuit by a second distance, the first distance being greater than the second distance.

20. The fiber optic communication system of claim 16 wherein the two lines each have a varying diameter such that the diameters of the two lines immediately adjacent the driver circuit are smaller than the diameters of the two lines immediately adjacent the light emitting source.

21. A transmitter, comprising:
a driver circuit configured to receive a modulated electrical signal and to have a driver circuit output impedance;
a light emitting source having a light emitter impedance different than the driver circuit output impedance, the light emitting source configured to receive the modulated electrical signal such that the light emitting source produces a modulated optical signal proportional to the modulated electrical signal; and
a transmission line comprising first and second lines, each of the first and second lines including a first end coupled to the driver circuit and a second end coupled to the light emitting source, the first and second lines being spaced apart from each other such that a first distance between the respective first ends of the first and second lines is different from a second distance between the respective second ends of the first and second lines.

22. The transmitter as recited in claim 21, wherein a change from the first distance to the second distance is substantially linear.

23. The transmitter as recited in claim 21, wherein the first distance is greater than the second distance.

24. A transmitter, comprising:
a driver circuit configured to receive a modulated electrical signal and to have a driver circuit output impedance;
a light emitting source having a light emitter impedance different than the driver circuit output impedance, the light emitting source configured to receive the modulated electrical signal such that the light emitting source produces a modulated optical signal proportional to the modulated electrical signal; and
a transmission line comprising a first line and a second line, each of the first and second lines including a first end coupled to the driver circuit and a second end coupled to the light emitting source, and the first and second lines configured such that:
a first end of the first line has a different cross-sectional size than a cross-sectional size of a second end of the first line; and
a first end of the second line has a different cross-sectional size than a cross-sectional size of a second end of the second line.

25. The transmitter as recited in claim 24, wherein the first and second lines are spaced apart from each other such that a first distance between the respective first ends of the first and second lines is different from a second distance between the respective second ends of the first and second lines.

26. The transmitter as recited in claim 25, wherein the first distance is greater than the second distance.

27. The transmitter as recited in claim 24, wherein the respective first ends of the first and second lines have relatively smaller cross-sectional areas than the respective second ends of the first and second lines.

28. A transmitter, comprising:
a driver circuit configured to receive a modulated electrical signal and to have a driver circuit output impedance;
a light emitting source having a light emitter impedance different than the driver circuit output impedance, the light emitting source configured to receive the modulated electrical signal such that the light emitting source produces a modulated optical signal proportional to the modulated electrical signal; and a transmission line that includes first and second lines, each of the first and second lines including a first end coupled to the driver circuit and a second end coupled to the light emitting source, and a material composition of the transmission line varying over a length of the transmission line.

29. A transmitter, comprising:

a driver circuit configured to receive a modulated electrical signal and to have a driver circuit output impedance;

a light emitting source having a light emitter impedance different than the driver circuit output impedance, the light emitting source configured to receive the modulated electrical signal such that the light emitting source produces a modulated optical signal proportional to the modulated electrical signal;

a transmission line that includes first and second lines, each of the first and second lines including a first end coupled to the driver circuit and a second end coupled to the light emitting source; and a ground plane having a first end coupled to the driver circuit and a second end coupled to the emitting source, the ground plane being arranged such that a first distance between the ground plane and the transmission line at the driver circuit is different from a second distance between the ground plane and the transmission line at the light emitting source.

30. The transmitter as recited in claim 29, wherein the first distance is greater than the second distance.

* * * * *

UNITED STATES PATENT AND TRADEMARK OFFICE
CERTIFICATE OF CORRECTION

PATENT NO. : 7,433,602 B2
APPLICATION NO. : 10/756560
DATED : January 13, 2004
INVENTOR(S) : Diaz It is certified that error appears in the above-identified patent and that said Letters Patent is hereby corrected as shown below:

Title Page
Item 57, Abstract, replace "The light emitting source is configured to receive the modulated electrical signal such that it produces a modulated optical signal proportional to modulated electrical signal" with --The light emitting source is configured to receive the modulated electrical signal such that it produces a modulated optical signal proportional to the modulated electrical signal--

Drawings
Figure 3A, replace the figure with the figure herein depicted wherein the reference, line 40, has been added

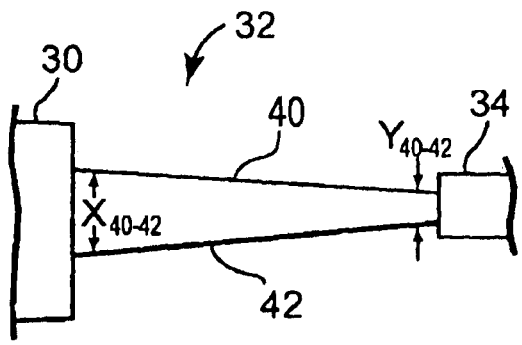

Fig. 3A

Column 1
Line 22, change "includes driver circuit" to --includes a driver circuit--
Line 54, change "matching" to --matches--

Column 2
Line 10, change "such it" to --such that it--
Line 11, change "to modulated" to --to the modulated--

Signed and Sealed this

Twenty-sixth Day of October, 2010

David J. Kappos
*Director of the United States Patent and Trademark Office*

CERTIFICATE OF CORRECTION (continued)
U.S. Pat. No. 7,433,602 B2

Column 3
Line 7, change "index of a fraction" to --index of refraction--
Line 33, change "transmitter 30" to --transmitter 12--

Column 4
Line 10, change "with impedance matching network" to --with an impedance matching network--
Line 11, change "being release" to --being released--
Line 53, change "transmission lines 32" to --transmission line 32--
Line 61, change "ground plan 46" to --ground plane 46--

Column 5
Line 15, change "tapers down" to --increases--
Line 18, change "tapers down" to --increases--
Line 38-39, change "laser 32" to --laser 34--
Line 45, change "achiever" to --achieve--
Line 53, change "laser 32" to --laser 34--

Column 10
Line 8, Claim 29, change "the emitting source" to --the light emitting source--